United States Patent
Bolger et al.

(10) Patent No.: US 11,623,629 B2
(45) Date of Patent: Apr. 11, 2023

(54) ONE-PEDAL DRIVE METHOD TO CONTROL VEHICLE SPEED TO A STOP USING FEEDBACK POWERTRAIN TORQUE CONTROLS

(71) Applicant: Ford Global Technologies, LLC, Dearborn, MI (US)

(72) Inventors: Bryan Michael Bolger, Canton, MI (US); Sergey Gennadievich Semenov, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 175 days.

(21) Appl. No.: 17/135,630

(22) Filed: Dec. 28, 2020

(65) Prior Publication Data
US 2022/0097670 A1 Mar. 31, 2022

Related U.S. Application Data
(60) Provisional application No. 63/084,527, filed on Sep. 28, 2020.

(51) Int. Cl.
| | | |
|---|---|---|
| *B60W 10/08* | (2006.01) | |
| *B60W 10/18* | (2012.01) | |
| *B60W 30/18* | (2012.01) | |
| *B60L 15/20* | (2006.01) | |

(52) U.S. Cl.
CPC ............ *B60W 10/18* (2013.01); *B60W 10/08* (2013.01); *B60W 30/18127* (2013.01); *B60L 15/2009* (2013.01); *B60L 2240/421* (2013.01); *B60L 2240/423* (2013.01); *B60W 2520/10* (2013.01); *B60W 2540/10* (2013.01);
(Continued)

(58) Field of Classification Search
CPC ................ B60W 10/08; B60W 10/18; B60W 30/18127; B60W 2520/10; B60W 2540/10; B60W 2540/12; B60W 2710/08; B60W 2710/018; B60W 2720/10; B60W 2720/103; B60W 30/18072; B60W 30/18181; B60L 7/10; B60L 15/2009; B60T 2270/604
USPC ......................................... 477/188, 199, 200
See application file for complete search history.

(56) References Cited

U.S. PATENT DOCUMENTS

| | | | |
|---|---|---|---|
| 6,364,434 B1 * | 4/2002 | Sway-Tin | B60T 13/662 903/947 |
| 10,351,111 B2 | 7/2019 | Hernandez | |
| 11,130,403 B1 * | 9/2021 | Woodland | B60T 7/042 |

(Continued)

FOREIGN PATENT DOCUMENTS

KR 101618453 B1 5/2016

*Primary Examiner* — Roger L Pang
(74) *Attorney, Agent, or Firm* — David B. Kelley; Brooks Kushman P.C.

(57) ABSTRACT

A controller, responsive to accelerator pedal release and a speed of the vehicle being less than a threshold, operates an electric machine to provide braking torque according to a predetermined speed versus time profile that defines a predetermined duration for the speed to become zero and a target speed for each time instant during the predetermined duration such that, for a given one of the time instants, the electric machine increases the braking torque responsive to the speed being greater than the target speed and decreases the braking torque responsive to the speed being less than the target speed.

15 Claims, 3 Drawing Sheets

(52) U.S. Cl.
CPC ..... *B60W 2540/12* (2013.01); *B60W 2710/08* (2013.01); *B60W 2710/18* (2013.01); *B60W 2720/103* (2013.01)

(56) References Cited

U.S. PATENT DOCUMENTS

| | | | |
|---|---|---|---|
| 2021/0053552 A1* | 2/2021 | Szczepaniak | B60W 10/18 |
| 2021/0370780 A1* | 12/2021 | Cho | B60L 3/0015 |
| 2022/0063626 A1* | 3/2022 | Kaneko | B60W 30/18127 |
| 2022/0097671 A1* | 3/2022 | Bolger | B60L 7/18 |
| 2022/0097700 A1* | 3/2022 | Semenov | B60W 50/085 |

* cited by examiner

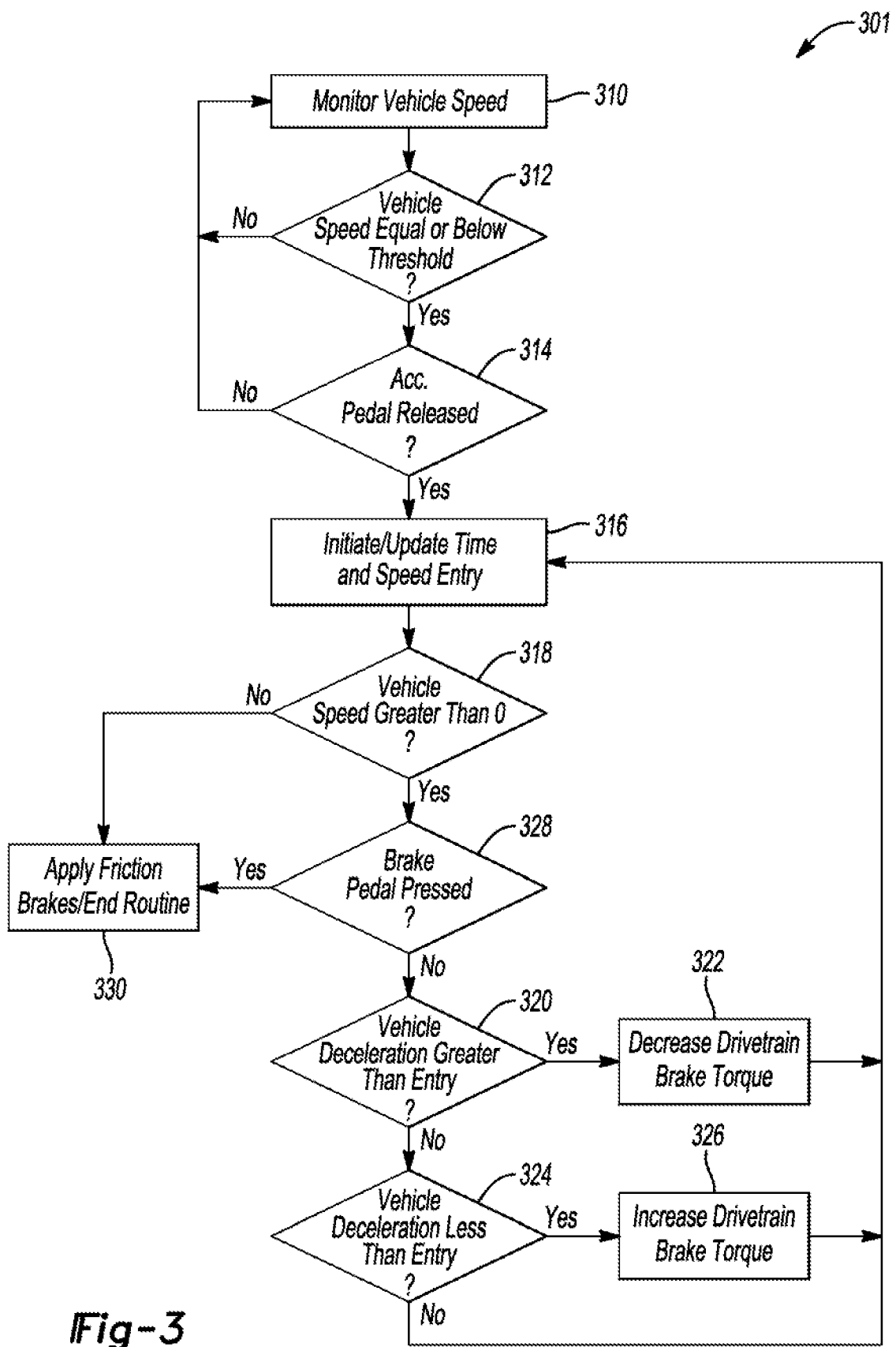

ONE-PEDAL DRIVE METHOD TO CONTROL VEHICLE SPEED TO A STOP USING FEEDBACK POWERTRAIN TORQUE CONTROLS

CROSS-REFERENCE TO RELATED APPLICATION

This application claims the benefit of Provisional App. No. 63/084,527, filed Sep. 28, 2020, which is hereby incorporated by reference in its entirety.

TECHNICAL FIELD

This disclosure relates to braking a vehicle.

BACKGROUND

In one pedal driving mode, a driver may not need to press the brake pedal to slow the vehicle or bring the vehicle to a stop. Just as pressing the accelerator pedal may cause the motor to propel the vehicle forward, releasing the accelerator pedal may cause the generator to regeneratively brake the vehicle—without use of the friction brakes.

SUMMARY

A vehicle includes an electric machine and a controller. The controller, after accelerator pedal release and a speed of the vehicle being less than a threshold, operates the electric machine to provide braking torque according to a predetermined speed versus time profile that defines a predetermined duration for the speed to become zero and a target speed for each time instant during the predetermined duration such that, for a given one of the time instants, the electric machine increases the braking torque responsive to the speed being greater than the target speed and decreases the braking torque responsive to the speed being less than the target speed.

A method for controlling a vehicle includes operating an electric machine to provide braking torque according to a predetermined speed versus time profile that defines a predetermined duration for the speed to become zero and a target speed for each time instant during the predetermined duration such that, for a given one of the time instants, the electric machine increases the braking torque responsive to the speed being greater than the target speed and decreases the braking torque responsive to the speed being less than the target speed.

A control system for a vehicle includes a controller that, upon accelerator pedal release, operates only an electric machine to brake the vehicle based on a speed of the vehicle.

BRIEF DESCRIPTION OF THE DRAWINGS

FIG. 3 illustrates an acceleration braking algorithm.

DETAILED DESCRIPTION

Figure 1:
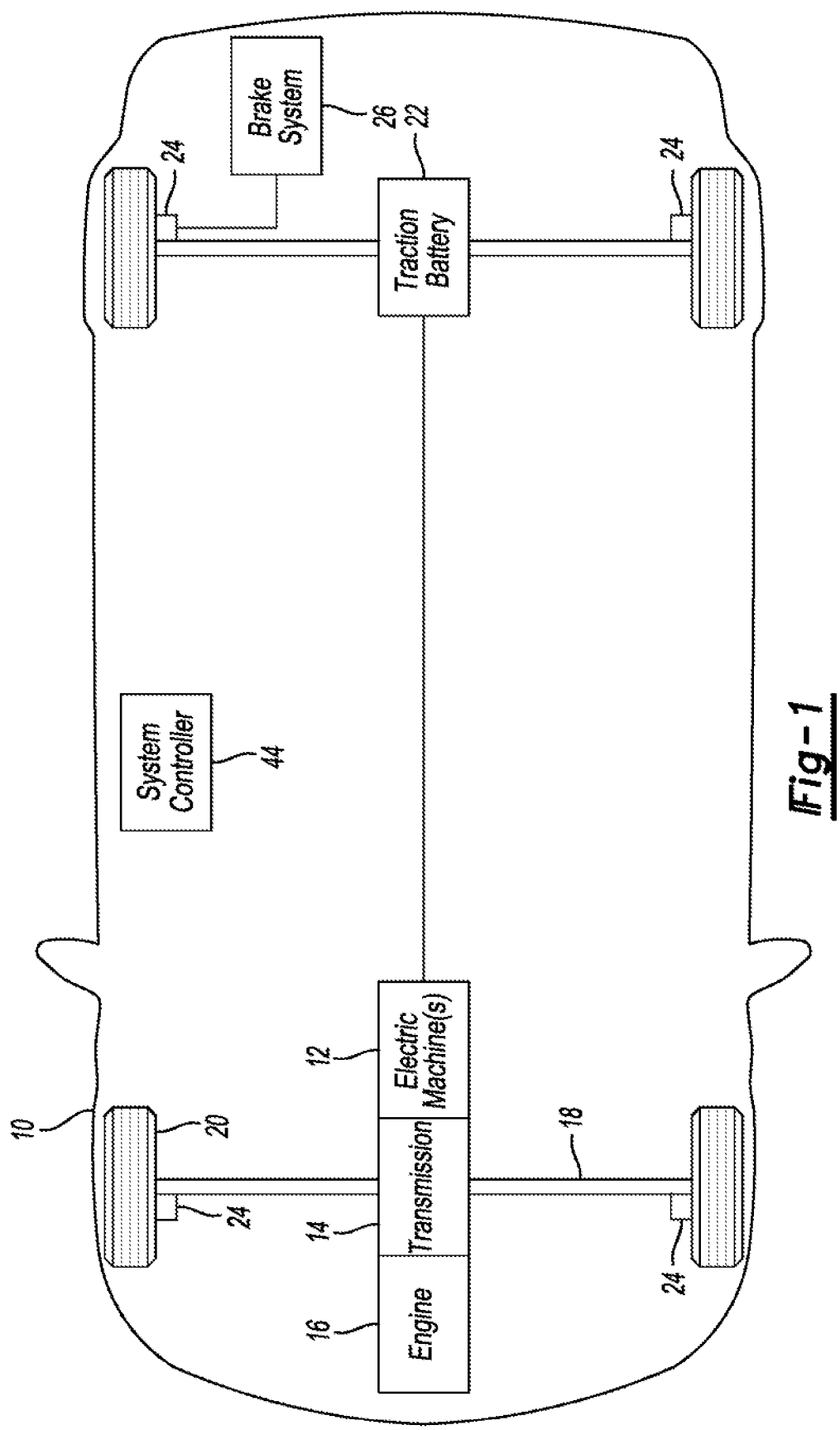
FIG. 1 illustrates a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A one pedal drive low speed controller is a feature that controls the vehicle to a complete stop from low speeds via powertrain torque modification when the vehicle is in one pedal drive mode and the driver has tipped out of the accelerator pedal. Assuming the vehicle is moving steadily before the tip out, the vehicle stopping feel and distance should be about the same on flat ground of the same quality when tip out repeatedly occurs at the same speed.

A vehicle may use an electric power source for propulsion. For example, the vehicle may include a traction battery used for propulsion of the vehicle. Additionally, the vehicle may be partially propelled by an internal combustion power source such as an internal combustion engine. In embodiments containing both electrical and internal combustion power sources, the internal combustion power source may be in electrical communication with the electrical power source, such that power generated by the internal combustion power source may be used to charge the electrical power source. In such embodiments, the internal combustion power source may use electrical power components to facilitate conversion of combustion power to electrical power. For example, the internal combustion power source may be in mechanical communication with a generator. The generator may be in electrical communication with the electrical power source in this configuration, the internal combustion power source may use combustion to operate the generator, thus charging the electrical power source. The vehicle may comprise other electrical power components. For example, the vehicle may comprise an additional electric machine. The electric machine may be configured to add negative torque to the vehicle during operation.

The vehicle may have an accelerator pedal. The accelerator pedal may be configured to control vehicle propulsion. To facilitate control of propulsion, the accelerator pedal may be configured such that pressing the pedal may request positive torque from a power source within the vehicle causing the vehicle to increase speed. Additionally, the accelerator pedal may be configured such that releasing the pedal may request negative torque with respect to the direction of vehicle motion, thus causing the vehicle to decrease in speed. Input from the accelerator pedal may be used to request negative torque from an electric machine, an electric power source, an internal combustion engine, regenerative braking, friction braking, and other sources of negative torque.

The vehicle may comprise a regenerative braking system. The regenerative braking system may be disposed within the wheels of the vehicle. The regenerative braking system may be in one of electromagnetic and mechanical communication with the wheels. In embodiments wherein the regenerative braking system is in electromagnetic communication with one of the drivetrain and the wheels, the regenerative braking system may use magnetic resistance to provide negative torque to the wheels, such that the vehicle speed may be decreased by the regenerative braking system. Additionally, the regenerative braking system may use energy collected from the inertia of the vehicle to generate electrical power. Further, the regenerative braking system may be in electrical communication with an electrical power source and configured to provide electrical power to the electrical power source. For example, the regenerative braking system may be used to charge a vehicle battery. The regenerative braking system may include electrical power components to facilitate the transfer of inertial energy into electrical power configured for the electrical power source. For example, the regenerative braking system may use a generator to convert inertia into electrical power.

The vehicle may comprise a friction braking system. The friction braking system may be disposed within the wheels of the vehicle. The friction braking system may be selectively in physical communication with the wheels such that in a first friction braking position, the friction braking system may provide a first friction coefficient to the wheels, and in a second friction braking position, provide a second friction coefficient to the wheels. The first friction coefficient may be zero. The second friction braking coefficient may work to provide negative torque to the wheels with respect to motion of the vehicle.

The vehicle may have a drivetrain. The drivetrain may be in at least one of electrical, magnetic, and mechanical communication with at least one of an internal combustion engine, an electric power source, and a regenerative braking system. In some embodiments, the drivetrain may be in fluid communication with the internal combustion engine. For example, the vehicle may have a torque converter between the drivetrain and the internal combustion engine.

The vehicle may have a propulsion braking system. The propulsion braking system may be in mechanical communication with the drivetrain. Hence, the propulsion braking system may be in one of electrical, magnetic, mechanical, and fluid communication with at least one of the internal combustion engine, electric power source, and regenerative braking system while the vehicle is traveling. As such, the propulsion braking system may receive inertial resistance from one of the internal combustion engine, electric power source, and regenerative braking system.

The vehicle may have a controller(s). The controller may be in electrical communication with at least one of the regenerative braking system, the friction braking system, the electrical power source, the mechanical power source, the drivetrain, and the accelerator pedal. As such, the controller may be able to control operations of these devices. For example, the controller may be configured to actuate the friction braking system. Similarly, the controller may be able to actuate the regenerative braking system. Further, the controller may be configured to operate an electrical machine capable of providing negative torque to the vehicle.

The controller may have a memory. The memory may contain a predetermined speed profile. The predetermined speed profile may be defined by speed and time axes. The memory may contain a predetermined acceleration profile. The predetermined acceleration profile may be defined by acceleration and time axes.

The controller may be in communication with a speed sensor. The speed sensor may be configured to determine a vehicle speed value. The speed sensor may provide the vehicle speed value to the controller. The controller may be in communication with an accelerometer. The accelerometer may be configured to determine the acceleration of the vehicle. Hence, the accelerometer may be configured to determine the deceleration of the vehicle. The accelerometer may be configured to provide the acceleration of the vehicle to the controller. Alternatively, the controller may use the speed value provided by a speed sensor to determine the acceleration of the vehicle. Similarly, the controller may be configured to use the acceleration of the vehicle to determine speed of the vehicle.

With reference to FIG. 1, electrified vehicle 10 may include one or more electric machines 12 mechanically coupled to a gearbox or hybrid transmission 14. The electric machines 12 may operate as a motor and a generator. In addition, the hybrid transmission 14 is mechanically coupled to an engine 16. The hybrid transmission 14 is also mechanically coupled to a drive shall 18 that is mechanically coupled to wheels 20. The electric machines 12 can provide propulsion and regenerative braking capability when the engine 16 is on or off, and allow the vehicle 10 to be operated in electric mode with the engine 16 off under certain conditions. The vehicle 10, in other arrangements, may lack the engine 16 (e.g., a battery electric vehicle). Other architectures are also contemplated.

A battery pack or traction battery 22 stores energy that can be used by the electric machines 12. The traction battery 22 may provide a high voltage direct current (DC) output. In addition to providing energy for propulsion, the traction battery 22 may provide energy for other vehicle electrical systems.

Wheel brakes 24 may be provided for braking and preventing motion of the vehicle 10. The wheel brakes 24 may be hydraulically actuated, electrically actuated, or some combination thereof. The wheel brakes 24 may be a part of a brake system 26. The brake system 26 may include other components to operate the wheel brakes 24. For simplicity, FIG. 1 depicts a single connection between the brake system 26 and one of the wheel brakes 24. A connection between the brake system 26 and the other wheel brakes 24 is implied. The brake system 26 may include a controller to monitor and coordinate its activities. The brake system 26 may monitor the brake components and control the wheel brakes 24. The brake system 26 may respond to driver commands and may also operate autonomously to implement features such as stability control. The controller of the brake system 26 may implement a method of applying a requested brake force when requested by another controller or sub-function.

Electronic modules in the vehicle 10 may communicate via one or more vehicle networks. The vehicle networks may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from an auxiliary battery. Different signals may be transferred over different channels of the vehicle network. For example, video signals may be transferred over a high speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 10.

Figure 2:
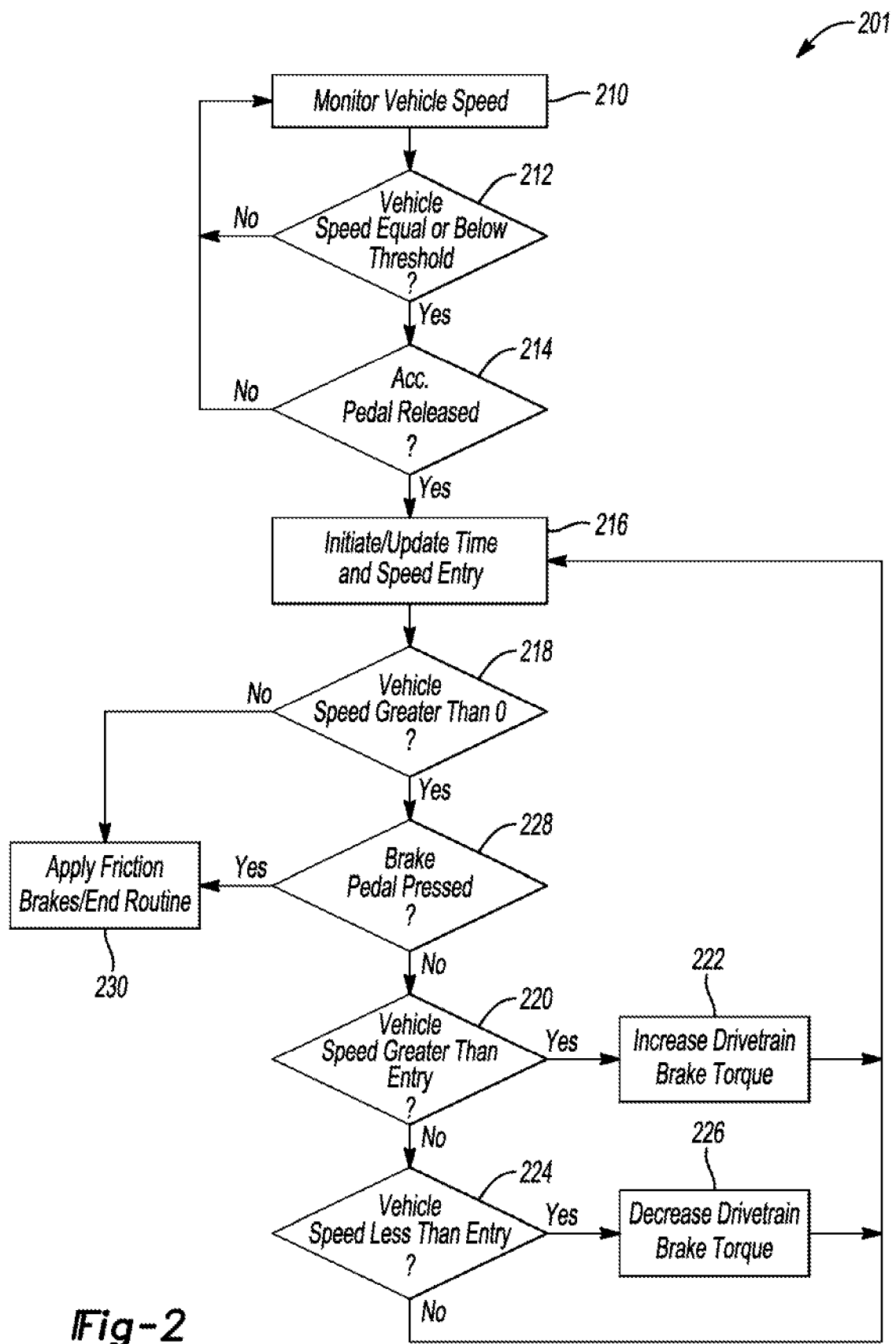
FIG. 2 illustrates a speed braking algorithm.

FIG. 2 depicts a speed algorithm 201. The speed algorithm may be enabled by the vehicle speed being within a range of the first threshold. Alternatively, the speed algorithm may be enabled by releasing a brake pedal. The speed algorithm 201 first comprises a monitor speed step 201 wherein the speed of the vehicle 10 is collected from a speed sensor. Alternatively, the speed for the vehicle 10 can be gathered from the transmission 14, accelerometer, or other source of displacement monitoring. The algorithm further comprises comparing the current vehicle speed with a predetermined threshold in the compare vehicle speed step 212. If the vehicle speed is above the threshold, the algorithm returns to the monitor speed step 201. If the vehicle speed is at or below the threshold (e.g., 5 kilometers per hour), the algorithm moves to the query accelerator pedal step 214. If the accelerator pedal is not released, the algorithm will return to the monitor speed step 201. If the accelerator pedal is released, the algorithm will initiate the timer and start the deceleration profile in the increment/update step 216. The deceleration profile may produce a series of time dependent entries. The entries may be speed entries. Further, the entries may be a range of values. The deceleration profile may be dependent upon the vehicle speed when the initiate/update step 216 is activated. The algorithm will continue to compare the vehicle speed to 0 in an initial standstill comparison step 218. If the vehicle speed is at 0, the algorithm will apply the friction brakes and end the routine in the end routine step 230. If the vehicle speed is greater than 0, the algorithm will move to a brake pedal query step 228, wherein the algorithm will determine if the brake pedal is depressed. If the brake pedal is depressed, the algorithm will move to the end routine step 230. If the brake pedal is not depressed, the algorithm will continue to compare the vehicle speed to the speed entry in the greater than speed comparison step 220. If the vehicle speed is greater than the speed entry for that time instant, the algorithm will move to the increase torque step 222 and increase the drivetrain brake torque. If the vehicle speed is not greater than the entry for that time instant, the algorithm will move to the less than entry comparison step 224, wherein the algorithm will determine if the vehicle speed is less than the speed entry for that time instant. If the vehicle speed is less than the speed entry for that time instant, the algorithm will move to the decrease torque step 226, wherein the algorithm will decrease the drivetrain brake torque. If the vehicle speed is not less than the speed entry for that time instant, the algorithm will return to the initiate/update step 216. After both the increase torque step 222 and the decrease torque step 226, the algorithm will return to the initiate/update step 216.

Thus, upon release of the accelerator pedal and the vehicle speed being less than a threshold, the manner in which the electric machine will produce braking torque to slow the vehicle will be controlled by comparing the vehicle speed to the profile described above. This profile defines a duration for which the vehicle speed is to be reduced to zero, and for each instant of the duration, a target speed. If, for example, the accelerator pedal is released at a speed of 4 kilometers per hour, the profile may define a 4 second duration for the vehicle speed to reach zero. The profile may further define, for example, a 3 kilometers per hour speed at 1 second into the duration, a 2 kilometers per hour speed at 2 seconds into the duration, and a 1 kilometer per hour speed at 3 seconds into the duration. If the vehicle speed is greater than the target at a given instant, the electric machine may produce more braking torque. If the vehicle speed is less than the target at a given instant, the electric machine may produce less braking torque. Moreover, the initial target speed and duration is based on the speed at which the accelerator pedal is released. Accelerator pedal release at 5.5 kilometers per hour may correspond to an initial target speed of 5 kilometers per hour and a duration to zero of 5 seconds. Accelerator pedal release at 4.5 kilometers per hour may correspond to an initial target speed of 4 kilometers per hour and a duration to zero of 4 seconds. Other scenarios and profiles are also contemplated.

FIG. 3 depicts an acceleration algorithm 301. The acceleration algorithm may be enabled by the vehicle speed being within a range of the first threshold. Alternatively, the acceleration algorithm may be enabled by releasing a brake pedal. The speed algorithm 301 first comprises a monitor speed step 301 wherein the speed of the vehicle 10 is collected from a speed sensor. Alternatively, the speed for the vehicle 10 can be gather from the transmission 14, accelerometer, or other source of displacement monitoring. The algorithm further comprises comparing the current vehicle speed with a predetermined threshold in the compare vehicle speed step 312. If the vehicle speed is above the threshold, the algorithm returns to the monitor speed step 301. If the vehicle speed is at or below the threshold, the algorithm moves to the query accelerator pedal step 314. If the accelerator pedal is not released, the algorithm will return to the monitor speed step 301. If the accelerator pedal is released, the algorithm will initiate the timer and start the deceleration profile in the increment/update step 316. The deceleration profile may produce a series of time dependent entries. The entries may be acceleration entries. Further the entries may be a range of values. The deceleration profile may be dependent upon the vehicle speed when the initiate/update step 316 is activated. The algorithm will continue to compare the vehicle speed to 0 in an initial standstill comparison step 318. If the vehicle speed is at 0, the algorithm will apply the friction brakes and end the routine in the end routine step 330. If the vehicle speed is greater than 0, the algorithm will move to a brake pedal query step 328, wherein the algorithm will determine if the brake pedal is depressed. If the brake pedal is depressed, the algorithm will move to the end routine step 330. If the brake pedal is not depressed, the algorithm will continue to compare the vehicle deceleration to the deceleration entry in the greater than deceleration comparison step 320. If the vehicle deceleration is greater than the deceleration entry for that time instant, the algorithm will move to the decrease torque step 322 and decrease the drivetrain brake torque. If the vehicle deceleration is not greater than the entry for that time instant, the algorithm will move to the less than entry comparison step 324, wherein the algorithm will determine if the vehicle deceleration is less than the deceleration entry for that time instant. If the vehicle deceleration is less than the deceleration entry for that time instant, the algorithm will move to the increase torque step 326, wherein the algorithm will increase the drivetrain brake torque. If the vehicle deceleration is not less than the deceleration entry for that time instant, the algorithm will return to the initiate/update step 316. After both the increase torque step and the decrease torque step 326, the algorithm will return to the initiate/update step 316.

Control logic or functions performed by one or more controllers may be represented by flow charts or similar diagrams in any of the various figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing, strategy being used. Similarly, the order of processing is not necessarily required to achieve the features and advantages described herein, but are provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in Whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
an electric machine; and
a controller programmed to, after accelerator pedal release and a speed of the vehicle being less than a threshold, operate the electric machine to provide braking torque according to a predetermined speed versus time profile that defines a predetermined duration for the speed to become zero and a target speed for each time instant during the predetermined duration such that, for a given one of the time instants, the electric machine increases the braking torque responsive to the speed being greater than the target speed and decreases the braking torque responsive to the speed being less than the target speed.

2. The vehicle of claim 1 further comprising friction brakes, wherein the controller is further programmed to, after brake pedal engagement, operate the friction brakes to provide braking torque according to brake pedal position and not the predetermined speed versus time profile.

3. The vehicle of claim 2, wherein the controller is further programmed to, after brake pedal release and the speed being less than the threshold, operate the electric machine to provide braking torque according to the predetermined speed versus time profile.

4. The vehicle of claim 1, wherein the speed at the accelerator pedal release defines the predetermined duration.

5. The vehicle of claim 1, wherein the speed at the accelerator pedal release defines an initial target speed.

6. A method for controlling a vehicle, comprising:
operating an electric machine to provide braking torque according to a predetermined speed versus time profile that defines a predetermined duration for the speed to become zero and a target speed for each time instant during the predetermined duration such that, for a given one of the time instants, the electric machine increases the braking torque responsive to the speed being greater than the target speed and decreases the braking torque responsive to the speed being less than the target speed.

7. The method of claim 6 further comprising, responsive to brake pedal engagement, operating the friction brakes to provide braking torque according to brake pedal position and not the predetermined speed versus time profile.

8. The method of claim 7 further comprising, responsive to brake pedal release and the speed being less than the threshold, operating the electric machine to provide braking torque according to the predetermined speed versus time profile.

9. The method of claim 6, wherein the speed at accelerator pedal release defines the predetermined duration.

10. The method of claim 6, wherein the speed at accelerator pedal release defines an initial target speed.

11. A control system for a vehicle comprising:
a controller programmed to, upon accelerator pedal release, operate only an electric machine to brake the vehicle based on a speed of the vehicle, wherein operating only an electric machine to brake the vehicle based on a speed of the vehicle includes controlling a speed of the vehicle according to a predetermined speed versus time profile that defines a predetermined duration for the speed to become zero and a target speed for each time instant during the predetermined duration.

12. The control system of claim 11, wherein the controller is further programmed to, responsive to brake pedal engagement, operate the friction brakes to control the speed according to brake pedal position and not the predetermined speed versus time profile.

13. The control system of claim 12, wherein the controller is further programmed to, responsive to brake pedal release and the speed being less than the threshold, operate the electric machine to control the speed according to the predetermined speed versus time profile.

14. The control system of claim 11, wherein the speed at the accelerator pedal release defines the predetermined duration.

15. The control system of claim 11, wherein the speed at the accelerator pedal release defines an initial target speed.

* * * * *